United States Patent
Kang et al.

(10) Patent No.: US 10,244,290 B2
(45) Date of Patent: Mar. 26, 2019

(54) SYSTEMS AND METHODS FOR PROVIDING ADVERTISING SERVICES TO DEVICES WITH DYNAMIC AD CREATIVE LOCALIZATION

(71) Applicant: Vungle, Inc., San Francisco, CA (US)

(72) Inventors: Daniel Kang, San Francisco, CA (US); David Gregson, San Francisco, CA (US)

(73) Assignee: Vungle, Inc., San Francisco, CA (US)

( * ) Notice: Subject to any disclaimer, the term of this patent is extended or adjusted under 35 U.S.C. 154(b) by 0 days.

(21) Appl. No.: 15/979,225

(22) Filed: May 14, 2018

(65) Prior Publication Data
US 2018/0262816 A1   Sep. 13, 2018

Related U.S. Application Data

(62) Division of application No. 14/677,956, filed on Apr. 2, 2015, now Pat. No. 10,009,662.

(51) Int. Cl.
| | |
|---|---|
| H04N 7/10 | (2006.01) |
| H04N 21/81 | (2011.01) |
| H04N 21/234 | (2011.01) |
| H04N 21/25 | (2011.01) |
| H04N 21/458 | (2011.01) |
| H04N 21/2668 | (2011.01) |
| H04N 21/258 | (2011.01) |

(Continued)

(52) U.S. Cl.
CPC .......... *H04N 21/812* (2013.01); *G06Q 30/02* (2013.01); *H04N 21/23424* (2013.01); *H04N 21/251* (2013.01); *H04N 21/25883* (2013.01); *H04N 21/2668* (2013.01); *H04N 21/41407* (2013.01); *H04N 21/458* (2013.01); *H04N 21/47205* (2013.01)

(58) Field of Classification Search
CPC ....................................................... H04N 21/812
See application file for complete search history.

(56) References Cited

U.S. PATENT DOCUMENTS

| 7,925,723 B1 * | 4/2011 | Amidon ............... G06Q 10/107 |
| | | 706/45 |
| 2002/0174025 A1 * | 11/2002 | Hind ...................... G06Q 30/02 |
| | | 705/26.1 |

(Continued)

OTHER PUBLICATIONS

Gluck, Marissa, Radar Research, "IAB Ad Engagement," Whitepaper Dec. 5, 2012 tweaks, 15 pages.

*Primary Examiner* — Olugbenga O Idowu
(74) *Attorney, Agent, or Firm* — Jaffery Watson Mendonsa & Hamilton LLC

(57) ABSTRACT

Methods and systems are described for providing advertising services to devices with dynamic ad creative localization for a user. In one embodiment, a system includes a storage medium to store one or more software programs and a dynamic ad creative localization unit that is configured to receive an ad campaign including at least one video ad from an ad server of the system, to apply filters to the ad campaign based on device characteristics, geographical data for the device, and a language of the device of the user in order to select an ad payload including a video ad of the ad campaign, to determine a language for the device of the user, and to localize any text in the ad campaign including the at least video ad based on the language of the device.

12 Claims, 7 Drawing Sheets

(51) Int. Cl.
*H04N 21/472* (2011.01)
*H04N 21/414* (2011.01)
*G06Q 30/02* (2012.01)

(56) References Cited

U.S. PATENT DOCUMENTS

| | | | |
|---|---|---|---|
| 2008/0059390 A1* | 3/2008 | Cox | G06Q 30/02 |
| | | | 706/12 |
| 2014/0040039 A1* | 2/2014 | Gates, III | G06Q 30/0269 |
| | | | 705/14.66 |
| 2014/0089956 A1* | 3/2014 | Shah | H04N 21/25891 |
| | | | 725/14 |
| 2015/0254732 A1* | 9/2015 | Snyder | G06Q 30/0276 |
| | | | 705/14.72 |

\* cited by examiner

SYSTEMS AND METHODS FOR PROVIDING ADVERTISING SERVICES TO DEVICES WITH DYNAMIC AD CREATIVE LOCALIZATION

This application is a divisional of co-pending U.S. patent application Ser. No. 14/677,956, filed on Apr. 2, 2015, which is incorporated herein by reference.

FIELD OF THE INVENTION

Embodiments of the invention are generally related to systems and methods for providing advertising services to devices with dynamic ad creative localization.

BACKGROUND

Mobile advertising is a form of advertising via mobile (wireless) phones or other mobile devices. Advertisements (ads) can be presented to the intended user in the form of banner ads, text boxes, and video ads. However, these ads may be difficult to distribute to a targeted user in a timely manner and the user may not be responsive and interested in the ads.

SUMMARY

Methods and systems are described for providing advertising services to devices with dynamic ad creative localization for a user. In one embodiment, a system includes a storage medium to store one or more software programs and a dynamic ad creative localization unit that is configured to receive an ad campaign including at least one video ad (e.g., optimal ad campaign based on having higher predicted conversion rate) from an ad server of the system, to apply filters to the ad campaign based on device characteristics, geographical data for the device, and a language of the device of the user in order to select an ad payload including a video ad of the ad campaign, to determine a language for the device of the user, and to localize any text in the ad campaign including the at least video ad based on the language of the device.

Other embodiments are also described. Other features of embodiments of the present invention will be apparent from the accompanying drawings and from the detailed description which follows.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Figure 1:
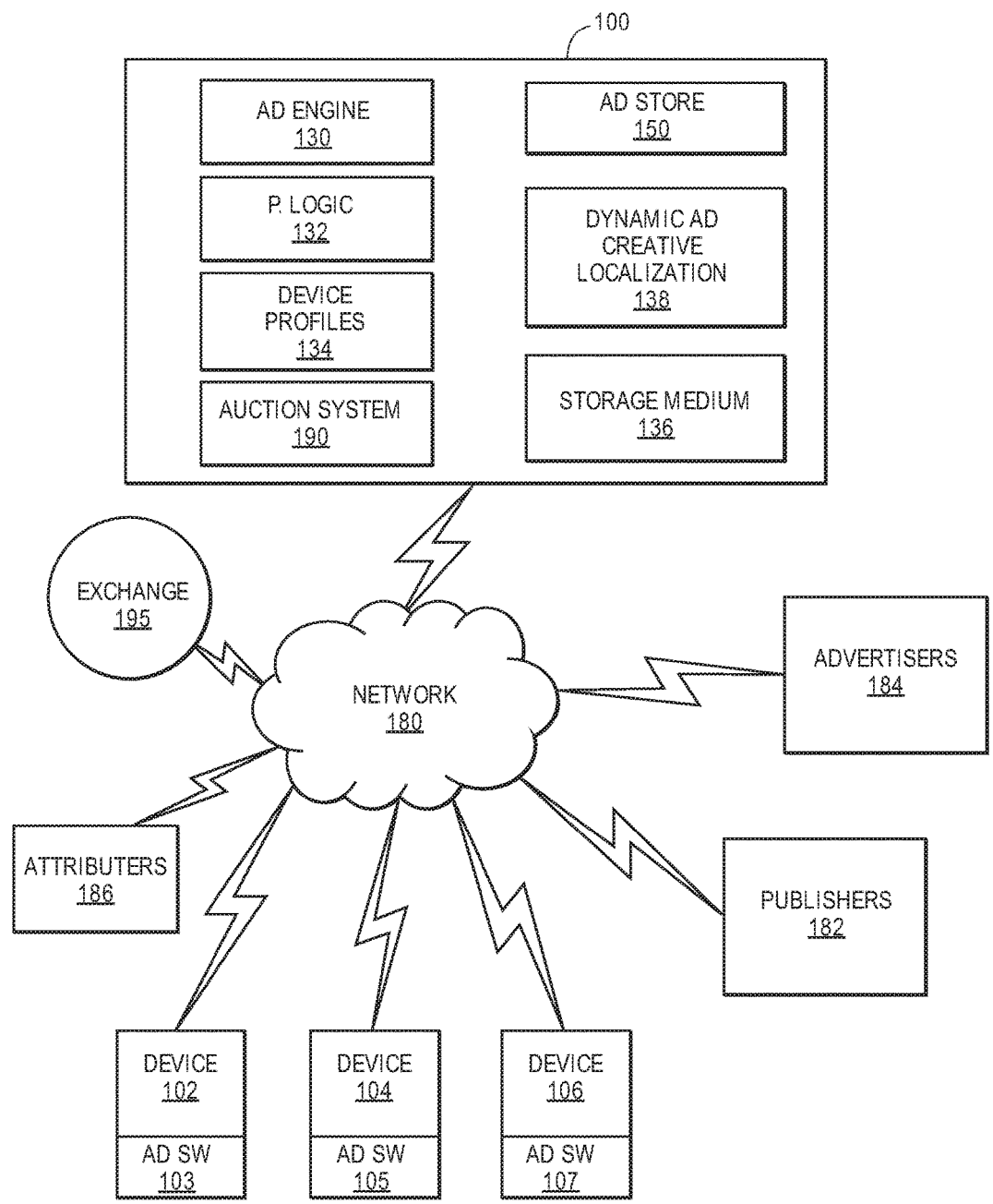
FIG. 1 shows an embodiment of a block diagram of a system 100 for providing advertising services to devices with dynamic ad creative localization in accordance with one embodiment.

Methods and systems are described for providing advertising services to devices with dynamic ad creative localization for a user. In one embodiment, a system includes a storage medium to store one or more software programs and a dynamic ad creative localization unit that is configured to receive an ad campaign including at least one video ad (e.g., optimal ad campaign based on having higher predicted conversion rate or higher predicted user engagement or interaction with the ad campaign) from an ad server of the system, to apply filters to the ad campaign based on device characteristics, geographical data for the device, and a language of the device of the user in order to select an ad payload including a video ad of the ad campaign, to determine a language for the device of the user, and to localize any text in the ad campaign including the at least video ad based on the language of the device.

In one embodiment, the dynamic ad creative localization unit is further configured to select the at least one video ad based on geographic location of the device and to compile assets for the ad campaign to create a localized user experience for the user of the device. In one example, the device characteristics include make and model of the device, support for hardware interaction between device and ad campaign, network connection between the advertising system and the device, whether the device is a mobile device or a tablet device, OS version, volume, screen size, orientation, and language setting.

In one example, the make and model of the device determine how interactive the device is with respect to the ad campaign including whether the device can interact with fully or partially interactive cards having interactive user interface elements or objects. In this manner, the within application (in-app) ad campaign is specially designed by the advertising system (or functionality of the device) with localized ad creatives for a user based on device characteristics, geographical data, and a language of the user. The user experience with an engaging ad campaign having the correct language, appropriate ads for a given location of the device and user, and ad campaigns that are fully supported (e.g., supporting feature rich creatives) by the device of the user. Additionally, voice overs or audio of video ads with the ad campaign are customized for the language of the user. The geographical data (e.g., city, country, mountain region, etc.) and device network connection(s) are also used to determine an optimal file size for the ad campaign to increase an ability for the user to quickly download the ad campaign with minimal data rate charges without slowing operating performance of the user's device.

An auction system provides a mechanism for third party participants to bid on providing advertising services including in-application (in-app) advertising services to the device in response to an actual or predictive ad exchange request. The auction system captures demand for providing advertising services in real time or near real time prior to the actual or the predicted ad play event on the device.

In mobile video advertising, high performing campaigns are needed for advertisers, publishers, and users of the publishers. Advertisers include organizations that pay for advertising services including ads on a publisher network of applications and games. Publishers provide content for users. Publishers can include developers of software applications, mobile applications, news content, gaming applications, sports news, etc. The publishers are interested in generating revenue through selling ad space to be on displayed in video ads to their users.

Performance can be defined in terms of click-through rates (CTR), conversion rates, and video completion rates. The process in which a user selects an ad is referred to as a click-through, which is intended to encompass any user selection. The ratio of a number of click-throughs to a number of times an ad is displayed is referred to as the CTR of the ad. A conversion occurs when a user performs a transaction related to a previously viewed ad. For example, a conversion may occur when a user views a video ad and installs an application being promoted in the video ad. A conversion may occur when a user views a video ad and installs an application being promoted in the video ad within a certain time period. A conversion may occur when a user is shown an ad and decides to make a purchase on the advertiser's web site within a certain time period. The ratio of the number of conversions to the number of times an ad is displayed is referred to as the conversion rate. A video completion rate is a ratio of a number of video ads that are displayed to completion to a number of video ads initiated on a device. Advertisers may also pay for their ads through an advertising system in which the advertiser bid on ad placement on a cost-per-click (CPC), cost-per-mille (CPM), cost-per-completed-view (CPCV), cost-per-action (CPA), and/or cost-per-install (CPI) basis. A mille represents a thousand impressions.

In this section several embodiments of this invention are explained with reference to the appended drawings. Whenever the shapes, relative positions and other aspects of the parts described in the embodiments are not clearly defined, the scope of the invention is not limited only to the parts shown, which are meant merely for the purpose of illustration.

FIG. 1 shows an embodiment of a block diagram of an ad system 100 for providing advertising services to devices with a customized adaptive user experience in accordance with one embodiment. The ad system 100 includes an advertising engine 130, processing logic 132, device profiles 134, storage medium 136, an ad store 150, a dynamic ad creative localization unit 138, and an auction system 190. The auction system 190 may be integrated with the ad system or separate from the ad system. The system 100 provides advertising services (e.g., ad campaigns for delivering in-app video ads to mobile devices, ad campaigns for delivering in-app video ads to any type of device) for advertisers 184 to devices 102, 104, and 106 (e.g., source device, client device, mobile phone, tablet device, lap top, computer, connected or hybrid television (TV), IPTV, Internet TV, Web TV, smart TV, satellite device, satellite TV, automobile, airplane, etc.). A device profile for a device is based on one or more parameters including location (e.g., GPS coordinates, IP address, cellular triangulation, etc.) of the device, a social profile for a user of the device, and categories or types of applications installed on the device.

Each device includes a respective advertising services software 103, 105, 107 (e.g., a software development kit (SDK)) that includes a set of software development tools for advertising services including in-app advertising services (e.g., advertising services delivered within mobile applications, advertising services delivered within non-web browser applications). In-app ad campaigns are ad campaigns (e.g., video ads) served to devices in-app (e.g., within mobile applications on a mobile device, within non-web browser software applications on a device, etc). The publishers 182 publish content along with selling ad space to advertisers. Attributers 186 may install software (e.g., software development kits of publishers) on client devices and track user interactions with publisher applications and advertisements. The attributers can then share this user data with the system 100 and the appropriate publishers and advertisers. The system 100, devices 102, 104, 106, advertisers 184, publishers 182, attributers 186, and an ad exchange 195 with third party exchange participants communicate via a network 180 (e.g., Internet, wide area network, WiMax, satellite, cellular, IP network, etc.). The third party exchange participants can bid in real time or approximately in real time (e.g., 1 hour prior to an ad being played on a device, 15 minutes prior to an ad being played on a device, 1 minute prior to an ad being played on a device, 15 seconds prior to an ad being played on a device, less than 1 second prior to an ad being played on a device) using the auction system 190 to provide advertising services (e.g., an in-app video ad that includes a preview (e.g., video trailer) of an application, in-app ad campaigns for brand and performance advertisers) for the devices. The ad campaign(s) are then delivered from any ad source to targeted user devices (e.g., 102, 104, 106) via the network 180. The processing logic 132 may include a filtering functionality for filtering potential available ad campaigns, an optimizer functionality for determining an optimal ad campaign, and a selector (picker) functionality for selecting an optimal campaign. The filtering functionality may filter ad campaigns based on availability, device characteristics (e.g., device profiles 134), and user characteristics (e.g., age, gender, ethnicity, location, etc.), etc.

In one embodiment, the system 100 includes a storage medium 136 to store one or more software programs. Processing logic (e.g., 132) is configured to execute instructions of at least one software program to receive an advertising request from a device upon the device having an ad play event for an initiated software application and associated advertising services software (e.g., software development kit (SDK)) on the device. The processing logic is further configured to send a configuration file to the device in response to the configuration call. The configuration file includes different options for obtaining at least one advertisement (ad) to play on the device during an ad play event. The options include playing at least one ad cached on the device, obtaining at least one ad from an ad store of the ad system 100, and obtaining at least one ad from an advertising exchange that includes $3r^d$ party participants.

The dynamic ad creative localization unit 138 provides an improved computer functionality of the system 100 for custom localization of an ad or ad campaign (e.g., video ad) for a user based on device characteristics (e.g., make and model of a user's device, support for hardware interaction between device and ad, network connection for user's device, whether user's device is mobile device or tablet device, OS version, volume, screen size and orientation, language setting), geographical data for the device (e.g., country, region, city), temporal data (e.g., time of day, day of week), and language of the user's device. The dynamic ad creative localization unit 138 localizes any text in the ad based on the language of the device and selects a video ad based on geographic location of the device. In one example, a creative is a file that is part of an ad campaign. Multiple creatives can be provided in the form of linear, nonlinear, or companions for a video ad serving template (VAST). A creative provides a look and feel of one or more user interfaces of an ad campaign.

Figure 2:
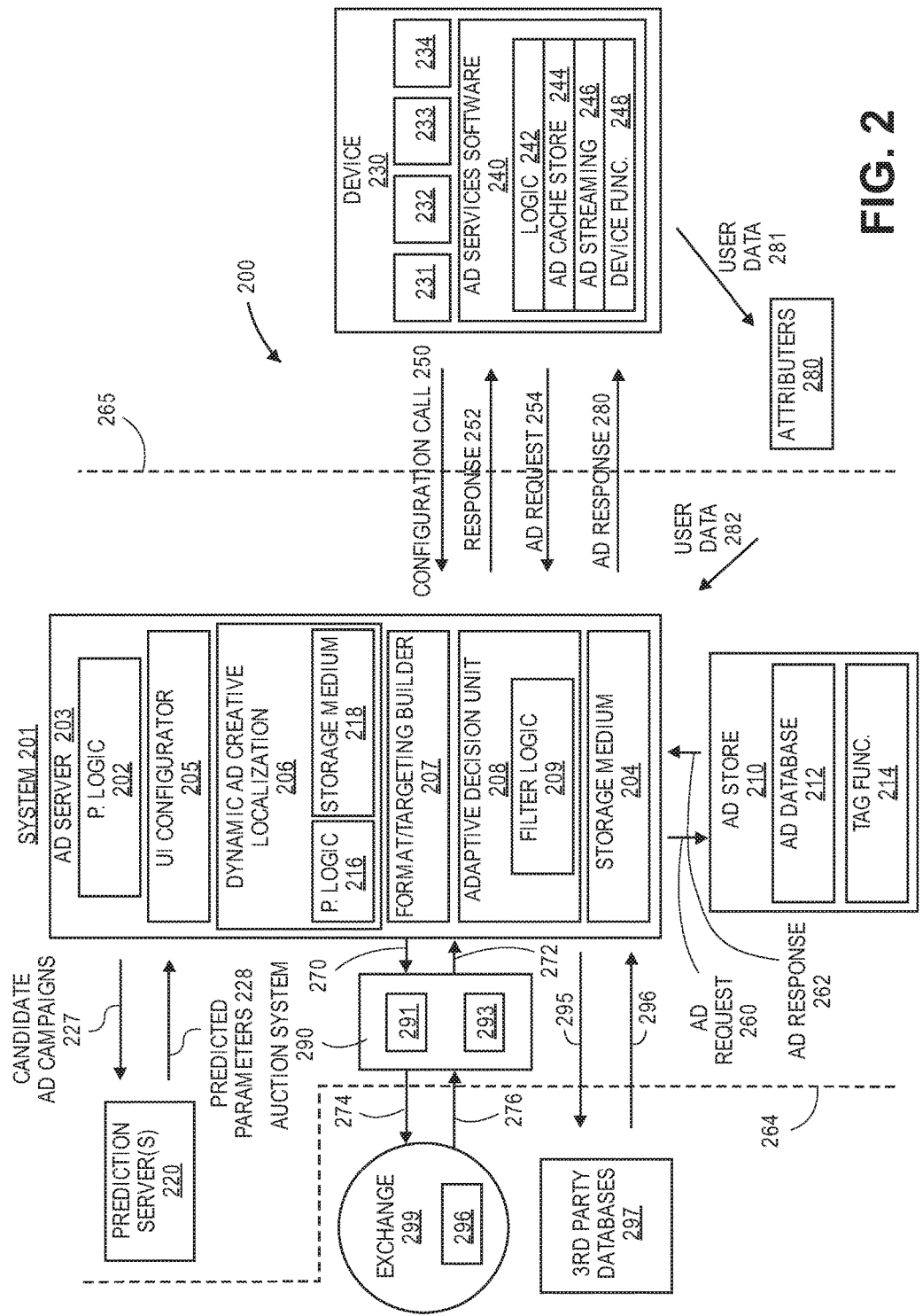
FIG. 2 illustrates a flow diagram of operations for providing advertising services including ads or ad campaigns to devices with dynamic ad creative localization in accordance with one embodiment.

FIG. 2 illustrates a flow diagram of operations for providing advertising services including ads or ad campaigns with dynamic ad creative localization in accordance with one embodiment. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, an advertising system performs the operations of method 200. The ad system 201, ad server 203, prediction server(s) 220 may include special purpose computers, which are designed or programmed to perform only advertising or publisher relating functions such as customized localization for ad campaign functions and ad serving functions for serving ads to client devices.

In one example, vertical dashed lines 264 and 265 represent a separation of the components of the system 201 (e.g., ad server 203, auction system 290, ad store 210, prediction server(s) 220) and components external to the system 201 (e.g., device 230, attributers 280, exchange 299, third party databases 297). The components of the system 201 communicate with the components external to the system via a network (e.g., network 180).

A device 230 (e.g., source device, client device, mobile phone, tablet device, lap top, computer, connected or hybrid television (TV), IPTV, Internet TV, Web TV, smart TV, etc) initiates a software application (e.g., at least one of software applications 231-234). For example, a user may select one of the software applications. The advertising services software 240 is also initiated upon the initiation of one of the software applications. The advertising services software 240 may be associated with or embedded with the software applications. The advertising services software 240 may include or be associated with logic 242 (e.g., communication logic for communications such as an ad request), an ad cache store 244 for storing one or more ads or ad campaigns, ad streaming functionality 246 for receiving, optionally storing, and playing streamed ads, and device functionality 248 for determining device and connection capabilities (e.g., type of connection (e.g., 4G LTE, 3G, 5G, WiFi, WiMax, etc.), bandwidth of connection, location of device, type of device, display characteristics (e.g., pixel density, color depth), etc.). The initiated software application or advertising services software may have an ad play event for displaying or playing an ad in-app on the display of the device. At operation 250, processing logic 202 of an ad server 204 of system 201 receives a configuration call from the device 230 upon the initiation of the software application and associated advertising services software 240. At operation 252, the processing logic 202 sends a response that includes at least one configuration file to the device 230 in response to the configuration call. The at least one configuration file includes different options for obtaining an ad to play for the ad play event. In one embodiment, a first option includes playing at least one ad that is cached on the device 230 during the ad play event. A second option includes planning to play at least one ad that is cached on the device 230 but asking for at least one better ad from the system 201. If the system 201 obtains and delivers at least one better ad in a timely manner (e.g., in time for a predicted ad play event, within a time period set by the at least one configuration file) then the at least one better ad will play during the predicted ad play event. The at least one better ad is expected to have a higher conversion rate or higher likelihood of obtaining a user interaction than the at least one cached ad. Otherwise, the cached ad is played. A third option includes planning to play at least one ad that is cached on the device 230 but asking for at least one better ad from the exchange 299. If the exchange 299 including third party databases 296 provides at least one better ad in a timely manner then the better ad having a predicted higher conversion rate will play during the ad play event. Otherwise, the cached ad is played. A fourth option includes planning to play at least one ad that is cached on the device 230 but asking for at least one better ad from the system 201 or the exchange 299. If the system 201 or the exchange 299 provide at least one better ad in a timely manner then the better ad having a predicted higher conversion rate will play during the ad play event. Otherwise, the cached ad is played.

A fifth option includes streaming at least one ad to be played during the predicted ad play event to the device 230. A sixth option includes planning to play at least one ad that is streamed to the device 230 but asking for at least one better ad from the system 201. If the system 201 provides the at least one better ad having a predicted higher conversion rate in a timely manner (e.g., in time for the ad play event, within a time period set by the configuration file) then the better ad will play during the ad play event. Otherwise, the planned streamed ad is played. A seventh option includes planning to play at least one ad that is streamed to the device 230 but asking for at least one better ad from the exchange 299. If the exchange 299 provides a better ad having a predicted higher conversion rate in a timely manner then the better ad will play during the ad play event. Otherwise, the planned streamed ad is played. An eighth option includes planning to play at least one ad that is streamed to the device 230 but asking for at least one better ad from the system 201 or the exchange 299. If the system 201 or the exchange 299 provide a better ad having a predicted higher conversion rate or higher user engagement in a timely manner then the better ad will play during the predicted ad play event. Otherwise, the planned streamed ad is played. In others embodiments, the configuration file includes a subset of the options 1-8, additional options for obtaining at least one ad or ad campaign, or different options (e.g., options that include potential caching and streaming operations).

The configuration file can be altered by the system 201 or the device 230 without affected the advertising services software 240. In particular, the configuration file can be altered without affecting a version of the advertising services software 240 such that a user does not need to update a version of the advertising services software even if the configuration file changes. The system 201 is designed to deliver the most relevant and highest converting ads to devices using the configuration file.

At operation 254, prior to a predicted ad play event or an actual ad play event, the processing logic of the ad server optionally receives an ad request with a configurable option (e.g., options 1-8) of the at least one configuration file based on an anticipated ad play event occurring in the near future (e.g., 1 hr, 15 minutes, 60 seconds, 10 seconds, etc.). The ad request may be a predictive ad request if it occurs prior to a predicted ad play event. Alternatively, the ad server generates an ad request based on receiving the configuration call, which indicates that the user has initiated a software application and an anticipated ad play event will likely occur in the near future even though no ad request is received from the device.

The ad request includes different types of information including publisher settings (e.g., a publisher of the selected software application), an application id to identify the selected software application, placement information for timing placement of an ad in-app (e.g., within mobile applications on a mobile device, within non-web browser software applications on a device, etc), user characteristics, device characteristics (e.g., device id), geographical data, location data, motion data (e.g., motion data from an accelerometer or gyroscope), language, time, application settings, demographic data for the user of the device, session data (e.g., how long a user has been using the selected application), and cache information.

The ad server also processes the ad request (or predictive ad request) using the adaptive algorithms (e.g., machine learning models) of the adaptive decision unit 208 to determine an ad campaign for serving to the device. Filter logic 209 may include geo-location data and cost budgets of publishers for different bid strategies (e.g., CPM, CPC, CPI, CPA, CPCV). The filter logic includes blacklists of ad campaigns or users to avoid, advertiser budget cost caps, daily view limits (DVLs), and back-offs for filtering eligible ad campaigns and selecting more attractive ad campaigns that are more likely to cause user interaction, user engagement, and generate more revenue. The DVLs define a limit for a number of times an advertiser shows an ad campaign to a user. In one example, a DVL limits an ad campaign to being displayed to a user 2 times per day. A back-off is a certain time period during which an ad or ad campaign can not be displayed to a user. The selected candidate ad campaigns are sent to a data science pipeline that includes machine learning models. At operation 227, the selected candidate ad campaigns are sent to machine learning models that are located on prediction server(s) 220 for analysis and modeling. The machine learning models can assign a value to each bid strategy and convert each bid strategy into an effective CPM strategy. For example, a CPI strategy is converted into a CPM strategy such that all bid strategies can be compared to each other in terms of effective CPM. The machine learning models build algorithms based on learned data rather than relying on explicitly programmed rules.

At operation 228, different predicted parameters including predicted conversion rates (e.g., a probability of a user selecting a software application for installation on the user's device, a probability of a user clicking on an option provided by a software application on the user's device, a probability of a click per mille (thousand impressions), a predicted life time value of a user) for different candidate ad campaigns are sent from the prediction server 220 to the ad server (or machine learning models provide selected ad campaign to ad server). The ad server may then apply additional filters of filter logic 209 such as business rules, publisher targeting objectives, and advertiser targeting objectives to the predicted parameters in order to select an optimal ad campaign.

The dynamic ad creative localization unit 206 includes processing logic 216 (e.g., one or more processing units) for executing instructions to provide an improved computer functionality to localize the ad campaigns in a custom manner for an individual user and a storage medium 218 to store the instructions. The dynamic ad creative localization unit 206 receives the optimal ad campaign (e.g., video ad, interactive card, interactive htm15 card) from the ad server and localizes the ad or ad campaign (e.g., video ad) for a specific user based on device characteristics (e.g., make and model of a user's device, support for hardware interaction between device and ad, network connection for user's device, whether user's device is mobile device or tablet device, OS version, volume, screen size and orientation, language setting), geographical data for the device (e.g., country, city), temporal data (e.g., time of day, day of week), and language of the user's device. The dynamic ad creative localization unit 206 localizes any text and audio in the ad based on the language of the device and selects a video ad based on geographic location of the device. In one example, some countries (e.g., India, China, etc.) have expensive data rate charges so the video ad would be in a condensed format to minimize data charges for a user of the device. Other countries with lower data rate charges would not require the video ad to be in a condensed format. The dynamic ad creative localization unit 206 then compiles assets for the ad campaign to create a localized user experience.

The selected localized ad campaign is then delivered to the device at operation 280. The ad campaign can be obtained from the ad server, an auction system 290, an ad exchange 299, third party databases 297, or an ad store 210.

For option 1, the device plays at least one ad from cache. For options that access the ad store 210, at operation 260, the processing logic 202 sends an ad call or request (or a predictive ad call or request) to the ad store 210 of the system 201. The ad store includes an ad database 212 having ad campaigns and ads. The ad database 212 may be a first party ad database, i.e., a database of system 201. The ad store may optionally provide access to third party ad databases 297 via tag functionality 214. The tag functionality 214 generates or stores an ad serving tag for accessing one or more third party ad databases 297. The ad campaigns and ads are capable of being streamed to ad streaming 246 of the device or saved in an ad cache store 240 of the device.

At operation 262, the ad server receives an ad response from the ad store 210 in response to the ad call or request (or predictive ad call or request). The ad response includes a payload with one or more potential ads or ads campaigns for being streamed to the device 230 or optionally an ad serving tag for accessing one or more third party ad databases 297. If the ad server receives an ad serving tag, then the ad server sends an ad request (or predictive ad request) to the third party database at operation 295 and receives an ad response (or predictive ad response) at operation 296 from the third party database 297. The ad response from the ad store or the third party databases 297 includes one or more ads or ad campaigns for being sent or streamed to the device 230. The processing logic 202 decides whether to stream at least one ad or ad campaign to the device 230 based on the determined or selected option of the at least one configurable file.

The ad server upon processing an ad request (or a predictive ad request) may access the exchange 299 given certain options (e.g., options 3, 4, 7, and 8) of the at least one configuration file. In this case, the ad server sends an exchange request (or a predictive exchange request 270) to the auction system 290 having an auction engine 291 and database 293 prior to a predicted ad play event or actual ad play event on the device. Alternatively, the auction system is integrated with the ad system 201. The auction engine 291 processes the ad exchange request 270 and generates an auction based on different business rules including at least one of a price (e.g., a floor or lowest price for the ad or ad campaign), inventory allocation, and participants who can participate in the auction. The auction determines which participant can provide a better ad for the device in a timely manner. At operation 274, the auction system 290 sends an ad exchange request (or a predictive ad exchange request to each participant of the auction). The ad exchange request (or predictive ad exchange request) includes configurable parameters including at least one of ad length, bit rate for playing the ad, ad categories, age ratings, a limit for a number of redirects to minimize latency, and the floor price. The configurable parameters are designed to enhance a user experience (e.g., by minimizing latency) and provide safety for the user based on the age rating. One or more participants then respond with an ad exchange response (or a predictive ad exchange response) at operation 276. The auction engine processes the ad exchange responses (or predictive ad exchange responses) (bids) and determines which participant(s) if any will serve a better ad for playing on the device for an actual ad play event (or a predicted ad play event). The responses and ads from the participants can be saved in the database 293. At operation 272, an ad response (or a predictive ad response) is sent from the auction engine to the ad server. The ad server then processes the ad from a winning or selected participant as determined by the auction system. In this case, the ad server unpacks the payload of the ad and converts a format of the ad (if necessary) into a standard format (e.g., xml standard, digital video ad serving template (VAST)) for ads served by the ad server. The ad server can compare a better ad from the winning or selected participant from the exchange or possibly any of the bids from the exchange with a cached ad on the device and a better ad obtained with an ad response from the ad store. At operation 280, the ad server can then select at least one better ad from the ad store, a participant with a winning or selected bid from the exchange, a cached ad on the device, or optionally a third party database 297 that has not participated in the exchange. A better ad is anticipated to be more likely to convert or have a higher likelihood of obtaining a user interaction than the cached ad on the device. The at least one better ad if selected is then cached on the device or streamed to the device and played during the actual ad play event or a predicted ad play event that has been predicted to occur.

In one embodiment, the exchange is a private exchange that includes a limited number of private participants. The private exchange may be accessed in combination with accessing ads from the ad store and optionally with accessing ads from third party databases via ad serving tags. In another embodiment, the exchange is a public exchange that includes a limited number of public participants or an unlimited number of participants that meet the requirements of the configurable parameters. The public exchange may be accessed in combination with accessing ads from the ad store and optionally with accessing ads from third party databases via ad serving tags.

In a conventional ad network, a user initiates a software application on a mobile device and then the mobile device sends an ad request to the ad network. The ad network responds with an ad response. The mobile device then caches the ad contained with the ad response and plays the ad from cache during an ad play event. However, better, fresher, more relevant, customized, and adaptive ads (i.e., higher converting ads) may be available in comparison to the cached ad of the conventional ad network.

A user interface (UI) configurator 205 provides a custom scripting framework for publishers, developers, or advertisers to create and edit fully customizable ad formats. The UI configurator can create web pages using hypertext markup language (html) and cascade style sheets (CSS). The framework provides publishers unlimited flexibility over the look and feel of their ad integration. For example, a publisher can add a frame around a video ad if desired or the publisher can add an opt in interstitial after a certain level of a software application. An opt in interstitial provides the user the option of viewing an advertisement. A reward interstitial provides rewards or currency for a software application (e.g., gaming application, news application, social media application, etc.) in exchange for the user deciding to view the advertisement. There is no need to update an application on a client device because the format changes are handled with the ad server 203. The UI configurator may include a software development kit (SDK) or software tools. The SDK or software tools may be loaded on the device.

The ad format and targeting builder unit 207 may communicate with the UI configurator or be a separate unit. The ad format and targeting builder unit 207 allows a publisher or developer to create a new custom ad format while targeting the ad for one or more user segments, perform testing of different ad formats or timing placements, and launch in app without leaving a UI (e.g., dashboard) provided by the system 201. Any changes or edits for any aspect of the ad services are performed on the ad system. The advertising services software can be integrated with a software application of the publisher or developer and updated with any type of customized adaptive user experience without the user needing to update the software application of the publisher or developer. The ad format and targeting builder provides the following options to developers and publishers: custom scripting for fully custom look and feel; support for frames for an ad; video size options (e.g., full screen, partial screen, etc.); video length options (e.g., 15 seconds, 30 seconds, long form, all of these options, etc.); opt-in or autoplay ad options; skippable or forced ad options; muted, unmuted, or partial volume options; portrait or landscape options for the UI of a device, target user segments (e.g., non-payers, payers, highest payers; new users, loyal users, at risk users; high, medium, and low engagement users; advanced, intermediate, and beginner users); demand source options (e.g., hosted 1st party ad content, third party ad content, direct sold ads (e.g., direct sold ads between ad system and advertisers), ad exchange, programmatic brand ads, programmatic performance ads); and monetization options (e.g., video ad, in-app purchase), determined by the system 201, for best monetization mechanism for a specific user based on most likely conversion rate for video ad and in-app purchase. Alternatively, no monetization mechanism may be determined or used by the system 201.

Attributers 280 may have software (e.g., a SDK of the publisher of the application) installed on the user's device in order to obtain third party user data (e.g., user data 281 from the device 230). This user data may include tracking of a user's interaction and engagement with the software application, a length of time that the application is installed, an amount of purchases from the application, and buying patterns in terms of which products or services are purchased and when these products or services are purchased. An engagement rate indicates how engaged a user is with an ad in terms of cognitive (e.g., awareness, interest), physical (e.g., user-initiated transaction), and emotional factors. In one example, engagement with an ad video is measured in terms of play rate, playthrough rate, completion rates, video viewing time, and share rates. In another example, rich media engagement is measured in terms of display times, expansions, expansion times, interaction time and rate, form responses, game play, and share rates. In another example for mobile devices, engagement includes click to call, retail location, interaction rates, click to download, click to play, and share rates. The user data may also include monitoring target goals for how the user engages with the application. The user data (e.g., user data 282) can be shared with system 201, publishers, and advertisers.

Figure 3A:
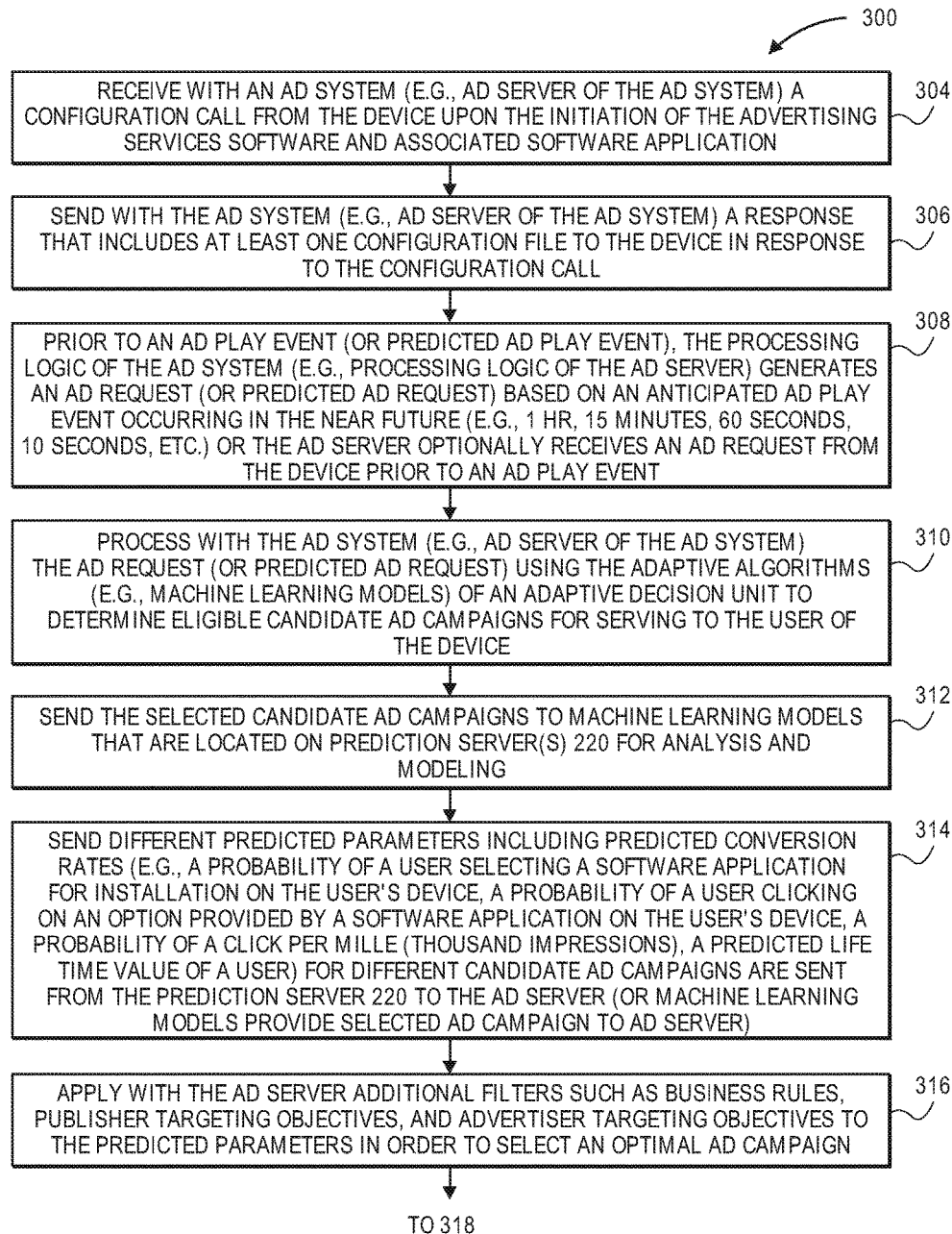
FIG. 3A-3B illustrates flow diagrams of operations for a method of providing advertising services including ads or ad campaigns to devices with dynamic ad creative localization in accordance with one embodiment.
Figure 3B:
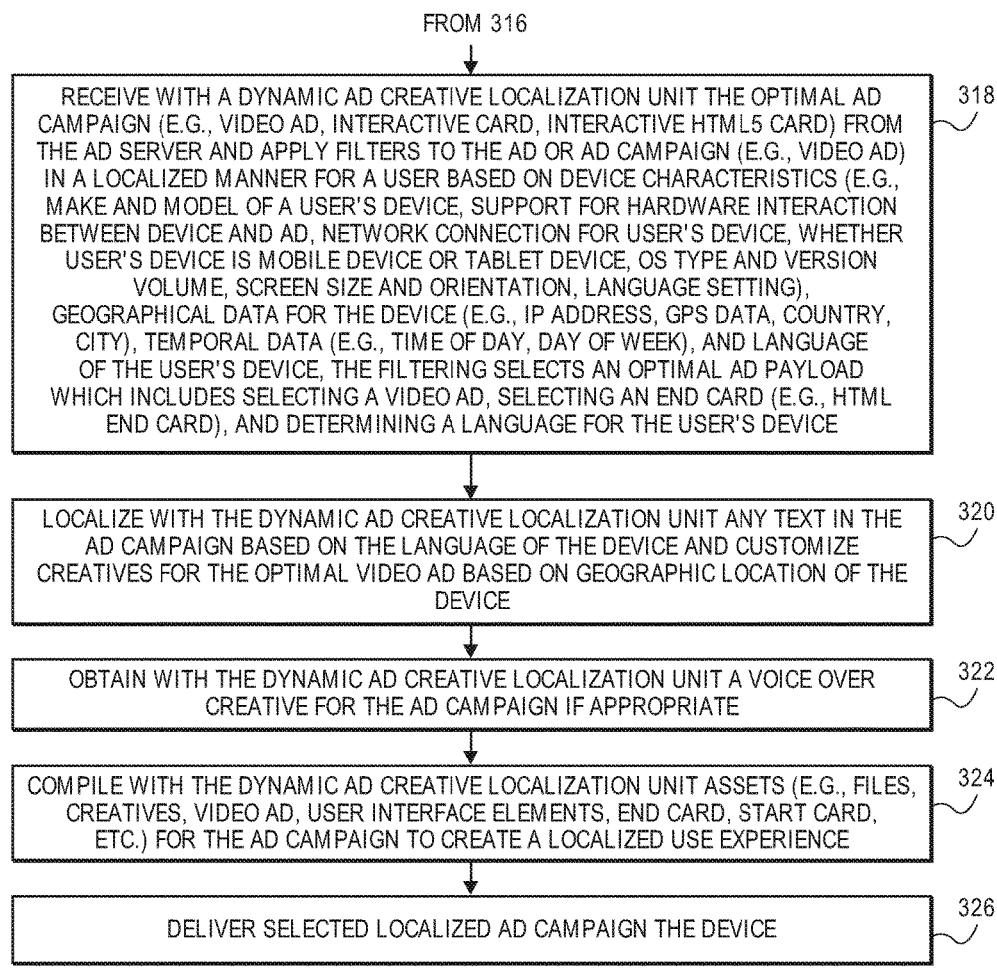

FIG. 3A-3B illustrates a flow diagram of operations for a method of providing advertising services including ads or ad campaigns to devices with dynamic ad creative localization in accordance with one embodiment. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, an advertising system (e.g., ad server, dynamic ad creative localization unit) performs the operations of method 300. The ad system communicates with a device, attributers, an exchange, and a third party database via a network (e.g., network 180).

In one embodiment, a device initiates a software application. For example, a user may select one of the software applications. The advertising services software (e.g., SDK) is also initiated upon the initiation of the software application. The advertising services software may be associated with or embedded with the software application. The advertising services software may include or be associated with logic 242, an ad cache store 244, ad streaming functionality 246, and device functionality 248 of device 230. The initiated software application may have an actual ad play event or a predicted ad play event at a future time for displaying or playing an ad on the display of the device. At operation 304, an ad system (e.g., ad server of the ad system) receives a configuration call from the device upon the initiation of the advertising services software and associated software application. At operation 306, the ad system (e.g., ad server of the ad system) sends a response that includes at least one configuration file to the device in response to the configuration call. The at least one configuration file includes different options (e.g., options 1-8 as described in conjunction with the description of FIG. 2) for obtaining an ad to play for the ad play event that is predicted to occur in the future.

At operation 308, prior to an ad play event (or predicted ad play event), the processing logic of the ad system (e.g., processing logic of the ad server) generates an ad request (or predicted ad request) based on an anticipated ad play event occurring in the near future (e.g., 1 hr, 15 minutes, 60 seconds, 10 seconds, etc.) or the ad server optionally receives an ad request from the device prior to an ad play event. Receiving the at least one configuration call from the device indicates that the user has initiated a software application and an anticipated ad play event will likely occur in the near future even if no predicted ad request is received from the device.

At operation 310, the ad system (e.g., ad server of the ad system) processes the ad request (or predicted ad request) using the adaptive algorithms (e.g., machine learning models of an adaptive decision unit) to determine eligible candidate ad campaigns for serving to the user of the device. The selected candidate ad campaigns can be sent to a data science pipeline that includes machine learning models. At operation 312, the selected candidate ad campaigns are sent to machine learning models that are located on prediction server(s) 220 (or adaptive decision unit) for analysis and modeling. At operation 314, different predicted parameters including predicted conversion rates (e.g., a probability of a user selecting a software application for installation on the user's device, a probability of a user clicking on an option provided by a software application on the user's device, a probability of a click per mille (thousand impressions), a predicted life time value of a user) for different candidate ad campaigns are sent from the prediction server(s) 220 to the ad server (or machine learning models of adaptive decision unit provide selected ad campaign to ad server). At operation 316, the ad server may then apply additional filters such as business rules, publisher targeting objectives, and advertiser targeting objectives to the predicted parameters in order to select an optimal ad campaign.

At operation 318, a dynamic ad creative localization unit receives the optimal ad campaign (e.g., video ad, interactive card, interactive htm15 card) from the ad server and applies filters to the ad or ad campaign (e.g., video ad) in a localized manner for a user based on device characteristics (e.g., make and model of a user's device, support for hardware interaction between device and ad, network connection for user's device, whether user's device is mobile device or tablet device, OS type and version, volume, screen size and orientation, language setting), geographical data for the device (e.g., IP address, GPS data, country, city), temporal data (e.g., time of day, day of week), and language of the user's device. For example, the make and model of a user's device can be used to determine how interactive (e.g., fully interactive, partially interactive) a user's device is with respect to an ad campaign including fully or partially interactive cards (e.g., user interfaces) having interactive user interface elements or objects. Feature rich cards may be available only for more recent device make and models. Reduced feature cards may be needed for older device make and models. The device make and model will determine whether an ad campaign can be rendered on the device.

An available bandwidth for a network connection between the ad system and the device will determine how large of a file size can be sent to the device and a download speed of the device will also determine the file size of the ad payload of the ad campaign. Other important device characteristics include operating system (OS) level for the device which may have OS limitations, volume setting which influences types of video ads, and screen orientation (e.g., landscape orientation, portrait orientation) which determines types of ad creatives for display on the device. In one example, a landscape orientation of a display device of a client device will cause portrait creatives to be removed from available creatives. A screen or display size of a device also filters eligible ad creatives (e.g., ad colors, voice over or not for ad, types of start cards, types of end cards, etc.) for the optimal ad campaign. For example, a tablet device having a larger screen size than a mobile device would be eligible for more types of creatives including creative having additional selectable options for an end card (e.g., last screen shot or user interface of the ad campaign). A mobile device having a smaller screen or display size would be limited to a smaller set of creatives designed from mobile devices. In one embodiment, the dynamic ad creative localization unit for the filtering at operation 318 selects an optimal ad payload which includes selecting a video ad, selecting an end card (e.g., html end card), and determining a language for the user's device.

At operation 320, the dynamic ad creative localization unit localizes any text and audio (e.g., voice overs) in the ad campaign based on the language of the device and customizes creatives for the optimal video ad based on geographic location of the device. For example, if a device is set for Russian language for a user that is located in the United States then the text and audio for the ad would be in Russian (e.g., please download option in Russian) and the ad campaign would be localized for the location of the device in the Unites States.

In one example, some countries (e.g., India, China, etc.) have expensive data rate charges so the video ad would be in a condensed format to minimize data charges for a user of the device. Other countries with lower data rate charges would not require the video ad to be in a condensed format.

At operation 322, the dynamic ad creative localization unit obtains a voice over creative for the ad campaign if appropriate. The dynamic ad creative localization unit may need to process and translate an available first voice over creative in a first language into a second voice in a second language if the device uses the second language. At operation 324, the dynamic ad creative localization unit then compiles all assets (e.g., files, creatives, video ad, user interface elements, end card, start card, etc.) for the in-app ad campaign to create a localized user experience. The selected localized in-app ad campaign is then delivered to the device at operation 326. The ad campaign can be obtained from the ad server, an auction system 290, an ad exchange 299, third party databases 297, or an ad store 210. The dynamic ad creative localization unit provides improved computer functionality for localizing a selected ad campaign in a custom manner for an individual user.

Figure 4:
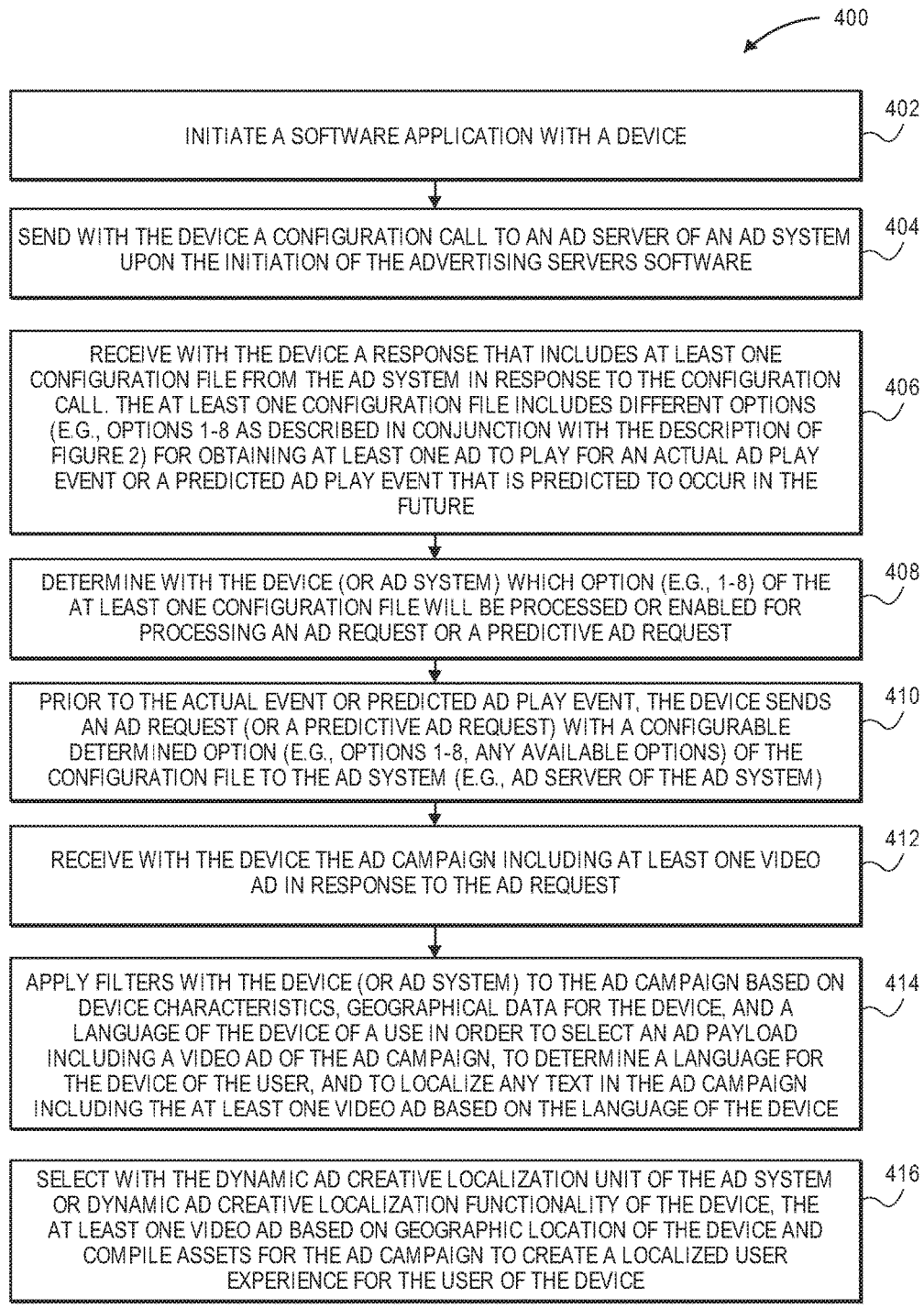
FIG. 4 illustrates a flow diagram of operations for a method of providing advertising services including ads or ad campaigns to devices with dynamic ad creative localization in accordance with one embodiment.

FIG. 4 illustrates a flow diagram of operations for a method of providing advertising services including ads or ad campaigns with a customized adaptive user experience in accordance with one embodiment. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a device performs the operations of method 400. The device communicates with the ad system via a network (e.g., network 180).

In one embodiment, a device initiates a software application at operation 402. For example, a user may select one of the software applications. The advertising services software (e.g., SDK) is also initiated upon the initiation of the software application. The SDK may be associated with or embedded with the software application. The advertising services software may include or be associated with logic 242, an ad cache store 244, ad streaming functionality 246, and device functionality 248 of device 230. The initiated software application may have an ad play event for displaying or playing an ad on the display of the device. At operation 404, the device sends a configuration call to an ad server of an ad system upon the initiation of the advertising services software. At operation 406, the device receives a response that includes at least one configuration file from the ad system in response to the configuration call. The at least one configuration file includes different options (e.g., options 1-8 as described in conjunction with the description of FIG. 2) for obtaining at least one ad to play for an actual ad play event or a predicted ad play event that is predicted to occur in the future.

At operation 408, the device (or ad system) determines which option (e.g., 1-8) of the at least one configuration file will be processed or enabled for processing an ad request or a predictive ad request. At operation 410, prior to the actual ad event or predicted ad play event, the device sends an ad request (or a predictive ad request) with a configurable determined option (e.g., options 1-8, any available options) of the configuration file to the ad system (e.g., ad server of the ad system). The ad system (e.g., ad server of the ad system) processes the ad request (or predictive ad request) in order to determine an ad campaign (e.g., an optimal ad campaign in terms of likelihood of converting, an optimal ad campaign in terms of likelihood of user interaction and engagement) of at least one ad or interstitial ad played in-app based on the information contained in the predictive ad request or ad request.

At operation 412, the device receives the ad campaign including at least one video ad in response to the ad request. At operation 414, the device (or ad system) applies filters to the ad campaign based on device characteristics, geographical data for the device, and a language of the device of a user in order to select an ad payload including a video ad of the ad campaign, to determine a language for the device of the user, and to localize any text and audio in the ad campaign including the at least video ad based on the language of the device. At operation 416, the device (or ad system) selects, with the dynamic ad creative localization unit of the ad system or dynamic ad creative localization functionality of the device, the at least one video ad based on geographic location of the device and compiles assets for the ad campaign to create a localized user experience for the user of the device. The device (e.g., device functionality, dynamic ad creative localization functionality) provides improved computer functionality for localizing a selected ad campaign in a custom manner for an individual user.

In one embodiment, the device characteristics include make and model of the device, support for hardware interaction between device and ad campaign, network connection between the advertising system and the device, whether the device is a mobile device or a tablet device, OS version, volume, screen size, orientation, and language setting. In one example, the make and model of the device determine how interactive the device is with respect to the ad campaign including fully or partially interactive cards having interactive user interface elements or objects of the ad campaign.

In another example, the screen size of the device is used to filter eligible ad creatives including ad colors, voice over or not for at least one video ad, types of start cards, and types of end cards for the ad campaign.

The operations of FIGS. 2-4 can be altered, modified, combined, or deleted. For example, at least some of the operations 227, 228, 270, 274, 276, 272, 260, 262 may be optional and not performed for certain ad request and ad response sequences. The methods in embodiments of the present invention may be performed with an apparatus or data processing system as described herein. In one example, the apparatus or data processing system may be a conventional, general-purpose computer system. In another example, the apparatus or data processing system is a special purpose computer(s), which are designed or programmed to perform only one function or a few functions including advertising targeting functionality, localization functionality, and ad delivery functionality.

Figure 5:
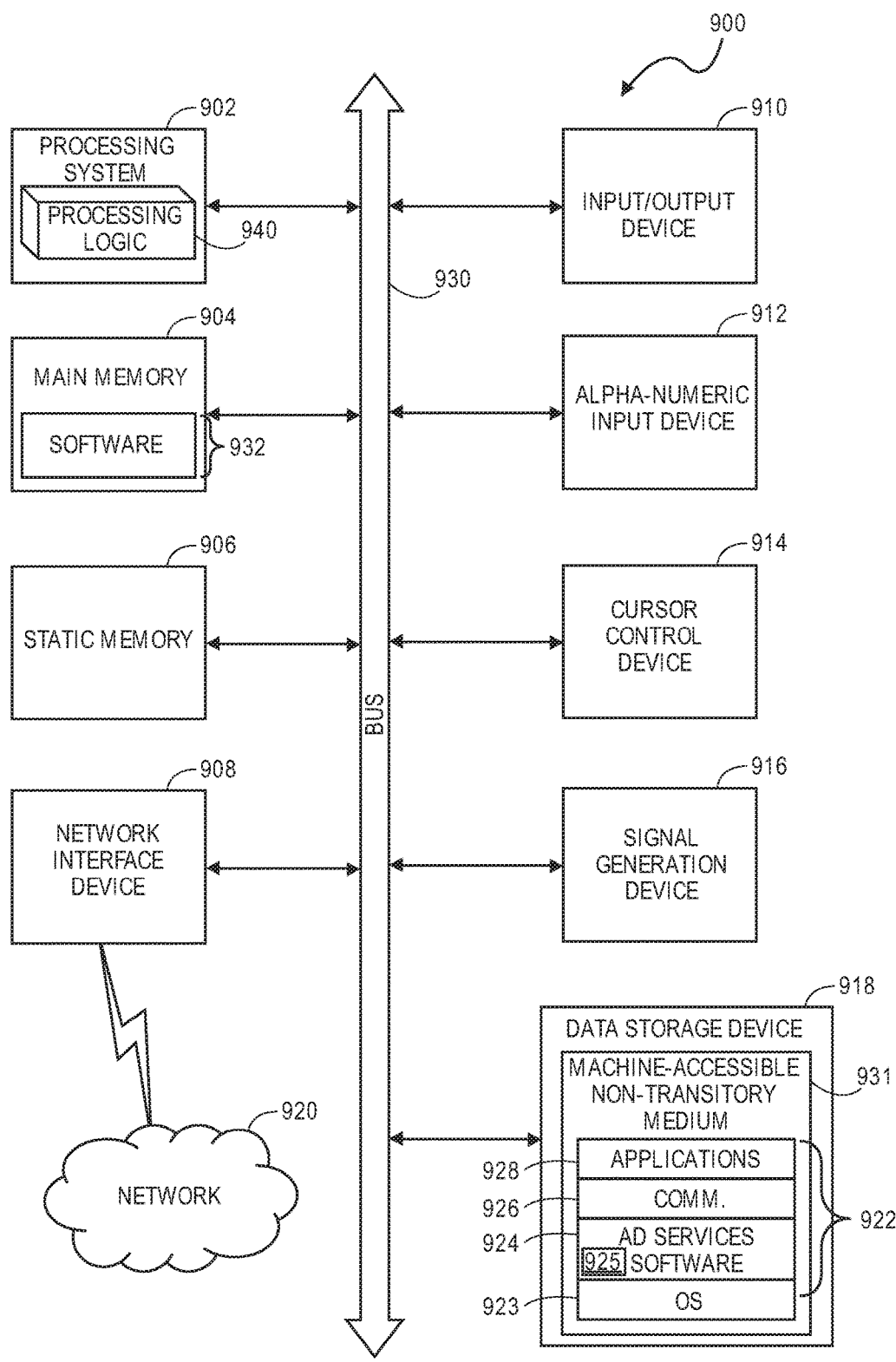
FIG. 5 illustrates a diagrammatic representation of a machine in the exemplary form of a device 900 within which a set of instructions, for causing the machine to perform any one or more of the methodologies discussed herein, may be executed in accordance with one embodiment.

FIG. 5 illustrates a diagrammatic representation of a machine in the exemplary form of a computer system or device 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a mobile device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary device 900 (e.g., system 100, system 201, device 230) includes a processing system 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing system 902 represents one or more general-purpose processing devices such as one or more microprocessors, central processing units, or the like. More particularly, the processing system 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system 902 may also be one or more special-purpose processing devices such as an application specific integrated circuit (ASIC), a field programmable gate array (FPGA), a digital signal processor (DSP), network processor, or the like. The processing system 902 is configured to execute the processing logic 926 for performing the operations and steps discussed herein.

The device 900 may further include a network interface device 908 that may include RF circuitry for sending and receiving RF cellular signals, a wireless transceiver for WiFi, a USB component, a NFC component, or any other communications component for sending and receiving communications. The device 900 also may include an input/output device 910 (e.g., a display, a liquid crystal display (LCD), a plasma display, a cathode ray tube (CRT), touch display device, or touch screen for receiving user input and displaying output), an optional alphanumeric input device 912 (e.g., a keyboard), an optional cursor control device 914 (e.g., a mouse), and a signal generation device 916 (e.g., a speaker).

The data storage device 918 may include a machine-accessible non-transitory medium 931 on which is stored one or more sets of instructions (e.g., software 922) embodying any one or more of the methodologies or functions described herein. The software 922 may include an operating system 923, advertising services software 924 (e.g., SDK 924), communications module 926, and applications 928 (e.g., publisher applications). The advertising services software 924 may include or be associated with dynamic ad creative localization functionality 925 for implementing operations of methods described herein. The software 922 may also reside, completely or at least partially, within the main memory 904 (e.g., software 932) and/or within the processing system 902 during execution thereof by the device 900, the main memory 904 and the processing system 902 also constituting machine-accessible storage media. The software 922 or 932 may further be transmitted or received over a network 920 via the network interface device 908.

The machine-accessible non-transitory medium 931 may also be used to store data structure sets that define user identifying states and user preferences that define user profiles. Data structure sets and user profiles may also be stored in other sections of device 900, such as static memory 906.

Figure 6:
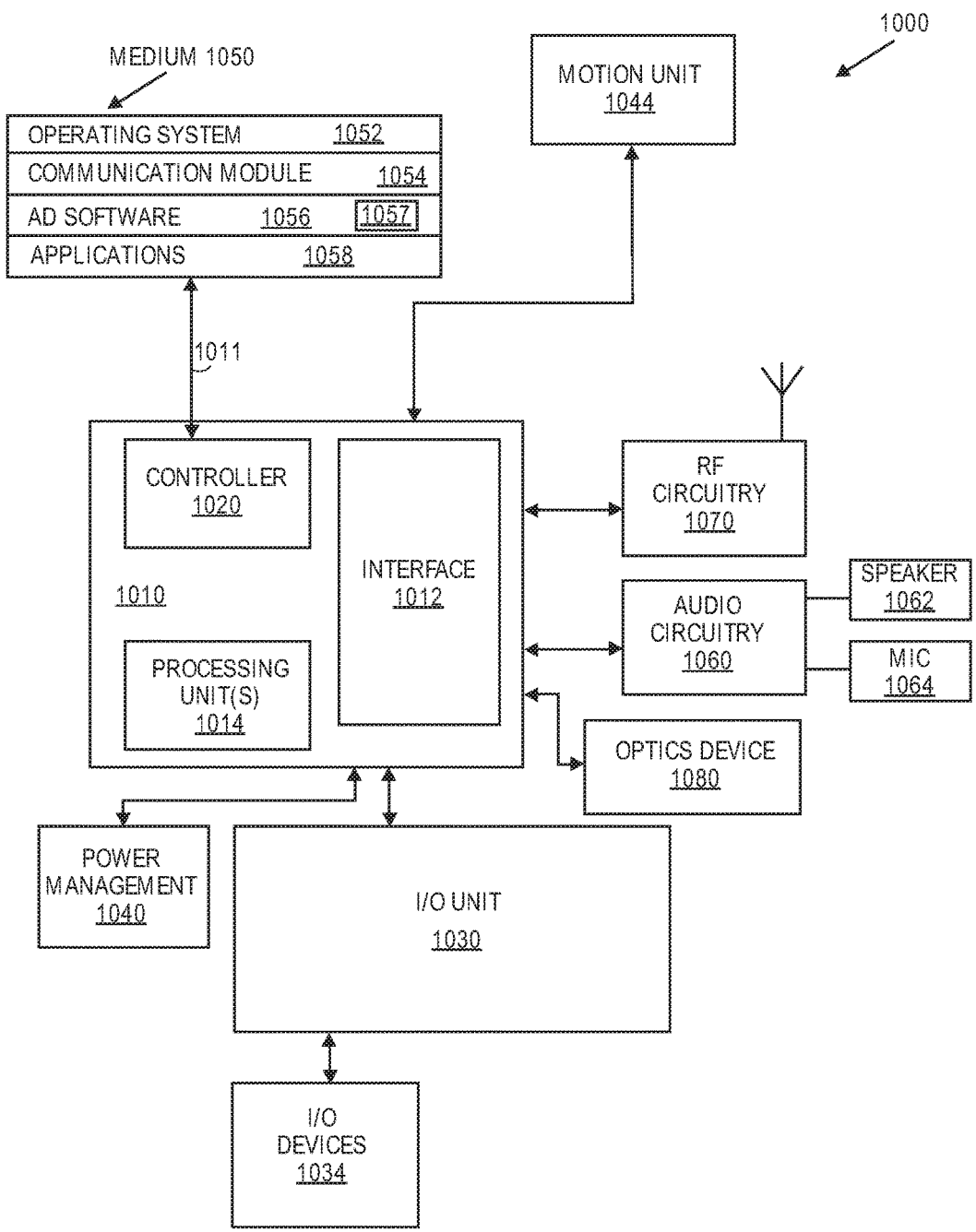
FIG. 6 is a block diagram of a wireless device 1000 in accordance with one embodiment.

FIG. 6 is a block diagram of a wireless device 1000 in accordance with one embodiment. The wireless device 1000 (e.g., device 230) may be any type of wireless device (e.g., cellular phone, wireless phone, tablet, etc.) for sending and receiving wireless communications. The wireless device includes a processing system 1010 that includes a controller 1020 and processing unit(s) 1014, which include processing logic. The processing system 1010 communicates with an Input/Output (I/O) unit 1030, radio frequency (RF) circuitry 1070, audio circuitry 1060, an optics device 1060 for capturing one or more images or video, a motion device (e.g., an accelerometer, gyroscope, etc.) for determining motion data (e.g., in three dimensions) for the wireless device 1000, power management system 1040, and machine-accessible non-transitory medium 1050. These components are coupled by one or more communication links or signal lines.

RF circuitry 1070 is used to send and receive information over a wireless link or network to one or more other devices. Audio circuitry 1060 is coupled to audio speaker 1062 and microphone 1064 and includes known circuitry for processing voice signals.

One or more processing units 1014 communicate with one or more machine-accessible non-transitory mediums 1050 (e.g., computer-readable medium) via controller 1020. Medium 1050 can be any device or medium (e.g., storage device, storage medium) that can store code and/or data for use by one or more processing units 1014. Medium 1050 can include a memory hierarchy, including but not limited to cache, main memory and secondary memory. The medium 1050 stores one or more sets of instructions (or software) embodying any one or more of the methodologies or functions described herein. The software may include an operating system 1052, advertising services software 1056 (e.g., SDK 1056), communications module 1054, and applications 1058 (e.g., publisher applications, developer applications, a web browser, html5 applications, etc.). The advertising services software 1056 (e.g., SDK 1056) may include or be associated with dynamic ad creative localization functionality 1057 for implementing operations of methods described herein. The software may also reside, completely or at least partially, within the medium 1050 or within the processing units 1014 during execution thereof by the device 1000. The components shown in FIG. 6 may be implemented in hardware, software, firmware or any combination thereof, including one or more signal processing and/or application specific integrated circuits.

Communication module 1054 enables communication with other devices. The I/O unit 1030 communicates with different types of input/output (I/O) devices 1034 (e.g., a display, a liquid crystal display (LCD), a plasma display, a cathode ray tube (CRT), touch display device, or touch screen for receiving user input and displaying output, an optional alphanumeric input device).

In one embodiment, a machine-accessible non-transitory medium contains executable computer program instructions which when executed by a data processing system cause the system to perform any of the methods discussed herein. While the machine-accessible non-transitory medium 1050 is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present invention. The term "machine-accessible non-transitory medium" shall accordingly be taken to include, but not be limited to, solid-state memories, optical and magnetic media, and carrier wave signals.

In one embodiment, a system (e.g., system 100, system 201) with dynamic ad creative localization for improved creative localization of an ad campaign with respect to a user of a device includes a storage medium (e.g., storage medium 136, storage medium 204) to store one or more software programs of an ad server. Processing logic of the ad server is coupled to the storage medium. The processing logic execute instructions of the one or more software programs of the ad server to implement functionality of the ad server.

A dynamic ad creative localization unit of the ad server is coupled to the processing logic. The dynamic ad creative localization unit is configured to receive an ad campaign including at least one video ad (e.g., optimal ad campaign based on having more user interaction, user engagement, and higher predicted conversion rate) from the ad server, to apply filters to the ad campaign based on device characteristics, geographical data for the device, and a language of the device of the user in order to select an ad payload including a video ad of the ad campaign, to determine a language for the device of the user, and to localize any text in the ad campaign including the at least video ad based on the language of the device.

In one embodiment, the dynamic ad creative localization unit is further configured to select the at least one video ad based on geographic location of the device and to compile all assets for the ad campaign to create a localized user experience for the user of the device. In one example, the device characteristics include make and model of the device, support for hardware interaction between device and ad campaign, network connection between the advertising system and the device, whether the device is a mobile device or a tablet device, OS version, volume, screen size, orientation, and language setting.

In one example, the make and model of the device determine how interactive the device is with respect to the ad campaign including whether the device can interact with fully or partially interactive cards having interactive user interface elements or objects. The screen size of a display device of the device can be used to filter eligible ad creatives including ad colors, voice over or not for at least one video ad, types of start cards, and types of end cards for the ad campaign.

In one embodiment, the dynamic ad creative localization unit is configured to localize any text and audio in the ad campaign based on the language of the device and to customize creatives for the ad campaign based on geographic location of the device. In one example, the processing logic of the ad server executes instructions to receive an ad request from the device upon the user initiating a software application on the device which is a mobile device and send the localized ad campaign to the mobile device in response to the ad request with the localized ad campaign being displayed on the mobile device within the initiated software application (in-app).

In one embodiment, a machine-accessible non-transitory medium containing executable computer program instructions which when executed by an advertising system cause the advertising system to perform a method for dynamic ad creative localization for improved ad campaigns for a device. The method includes receiving, with a dynamic ad creative localization unit, an ad campaign including at least one video ad and applying filters to the ad campaign based on device characteristics, geographical data for the device, and a language of the device of a user in order to select an ad payload including a video ad of the ad campaign, to determine a language for the device of the user, and to localize any text in the ad campaign including the at least video ad based on the language of the device.

In one embodiment, the method further includes selecting, with the dynamic ad creative localization unit, the at least one video ad based on geographic location of the device and compiling assets for the ad campaign to create a localized user experience for the user of the device. In one example, the device characteristics include make and model of the device, support for hardware interaction between device and ad campaign, network connection between the advertising system and the device, whether the device is a mobile device or a tablet device, OS version, volume, screen size, orientation, and language setting.

In one example, the make and model of the device determine how interactive the device is with respect to the ad campaign including whether the device can interact fully or partially with interactive cards having interactive user interface elements or objects of the ad campaign. In another example, the screen size of the device is used to filter eligible ad creatives including ad colors, voice over or not for at least one video ad, types of start cards, and types of end cards for the ad campaign.

In one embodiment, the method further includes localizing any text and audio in the ad campaign based on the language of the device and customizing creatives for the ad campaign based on geographic location of the device.

In one example, the method further includes receiving an ad request from the device upon the user initiating a software application on the device which is a mobile device and sending the localized ad campaign to the mobile device in response to the ad request with the localized ad campaign being displayed on the mobile device within the initiated software application (in-app).

In one embodiment, a device (e.g., device 230, device 900, device 1000) includes a storage medium (e.g., storage medium 931, storage medium 1050) to store one or more software programs, a display device to display localized advertisement campaigns on the device, and processing logic (e.g., processing logic 940, processing logic of processing unit(s) 1014) coupled to the storage medium. The processing logic is configured to execute instructions of at least one software program to initiate a software application and associated advertising services software (e.g., ad services software 240, ad services software 924, ad software 1056) on the device and generate, with the device, an ad request in response to the initiation of the software application and associated advertising services software. The ad request includes different types of information including publisher settings of the initiated software application on the device, an application id to identify the software application, and placement information for timing placement of at least one in-app ad or interstitial ad to be displayed on the device. The processing logic is further configured to execute instructions of at least one software program to generate, with the device, an ad request in response to the initiation of the software application and associated advertising services software, send the ad request to an ad system, receive an ad campaign including at least one video ad in response to the ad request, and apply filters, with dynamic ad creative localization functionality of the device or a dynamic ad creative localization unit of the ad system, to the ad campaign based on device characteristics, geographical data for the device, and a language of the device of a user in order to select an ad payload including a video ad of the ad campaign, to determine a language for the device of the user, and to localize any text in the ad campaign including the at least video ad based on the language of the device.

In one embodiment, the processing logic is further configured to execute instructions of at least one software program to select, with the dynamic ad creative localization functionality or dynamic ad creative localization unit, the at least one video ad based on geographic location of the device and to compile assets for the ad campaign to create a localized user experience for the user of the device.

In one example, the device characteristics include make and model of the device, support for hardware interaction between device and ad campaign, network connection between the advertising system and the device, whether the device is a mobile device or a tablet device, OS version, volume, screen size, orientation, and language setting. The make and model of the device can determine how interactive the device is with respect to the ad campaign including fully or partially interactive cards having interactive user interface elements or objects of the ad campaign.

In one example, the screen size of the device is used to filter eligible ad creatives including ad colors, voice over or not for at least one video ad, types of start cards, and types of end cards for the ad campaign.

In one example, the processing logic of the device is further configured to execute instructions of at least one software program to localize any text and audio in the ad campaign based on the language of the device and to customize creatives for the ad campaign based on geographic location of the device.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A wireless device for displaying a localized ad campaign, comprising:
a storage medium to store one or more software programs;
a display device to display a localized ad campaign in-application (in-app) on the wireless device; and
processing logic coupled to the storage medium, the processing logic is configured to execute instructions of at least one software program to:
generate, with the wireless device, an ad request in response to initiation of a software application and associated advertising services software on the wireless device;
send the ad request to an ad system;
receive an ad campaign including at least one video ad in response to the ad request; and
apply filters to the ad campaign for customized localization in response to wireless device characteristics including device model to determine support for device hardware interaction with fully and partially interactive user interface objects of the received ad campaign, operating system level and version of the wireless device, geographical data for the wireless device, and a language of the wireless device of a user in order to select an ad payload including a video ad of the ad campaign and eligible ad creatives that are customized for the wireless device, to determine a language for the wireless device of the user, and to localize any text in the ad campaign including the at least video ad based on the language of the wireless device, wherein a volume setting of the wireless device influences a type of video ad of the selected ad campaign.

2. The wireless device of claim 1, wherein the processing logic is further configured to execute instructions of at least one software program to:
select, with a dynamic ad creative localization unit, the at least one video ad based on geographic location of the wireless device; and
compile, with the dynamic ad creative localization unit, assets for the ad campaign to create a localized user experience for the user of the wireless device.

3. The wireless device of claim 1, wherein the filters are applied to the ad campaign for customized localization in response to wireless device characteristics that include make and model of the wireless device and support for hardware interaction between the wireless device and the ad campaign.

4. The wireless device of claim 3, wherein the make and model of the wireless device determine how interactive the wireless device is with respect to the ad campaign including fully or partially interactive cards having interactive user interface elements or objects of the ad campaign.

5. The wireless device of claim 1, wherein the filters are applied to the ad campaign for customized localization in response to wireless device characteristics that include a network connection between the advertising system and the wireless device to determine an optimal file size for the ad campaign to increase an ability for the user to download the ad campaign with minimal data rate charges without slowing operating performance of the wireless device.

6. The wireless device of claim 1, wherein the filters are applied to the ad campaign for customized localization in response to whether the wireless device is a mobile wireless device or a tablet wireless device.

7. The wireless device of claim 6, wherein a tablet device having a larger screen size than a mobile device is eligible for more types of creatives including creatives having additional selectable options for an end card or user interface of the ad campaign than the mobile device.

8. The wireless device of claim 1, wherein the filters are applied to the ad campaign for customized localization in response to OS version and volume of the wireless device.

9. The wireless device of claim 1, wherein the filters are applied to the ad campaign for customized localization in response to type of orientation including portrait and landscape for the wireless device.

10. The wireless device of claim 1, wherein a screen size of the display device is used to filter eligible ad creatives including ad colors and voice over or not for at least one video ad.

11. The wireless device of claim 1, wherein a screen size of the display device is used to filter eligible ad creatives including types of start cards and types of end cards for the ad campaign.

12. The wireless device of claim 1, wherein the processing logic is further configured to execute instructions of at least one software program to:

localize any text and audio in the ad campaign based on the language of the wireless device and to customize creatives for the ad campaign based on geographic location of the wireless device.

\* \* \* \* \*